(12) United States Patent
Lee et al.

(10) Patent No.: US 7,979,629 B2
(45) Date of Patent: Jul. 12, 2011

(54) MEMORY MODULE AND CONTROL METHOD OF SERIAL PERIPHERAL INTERFACE USING ADDRESS CACHE

(75) Inventors: Yu-Chu Lee, Hsin Chu County (TW); Wen-Kuan Chen, Hsin Chu County (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 418 days.

(21) Appl. No.: 12/257,913

(22) Filed: Oct. 24, 2008

(65) Prior Publication Data

US 2009/0113118 A1 Apr. 30, 2009

(30) Foreign Application Priority Data

Oct. 26, 2007 (TW) ................................ 96140171 A

(51) Int. Cl.
*G06F 12/00* (2006.01)
(52) U.S. Cl. .......................................... 711/103; 710/62
(58) Field of Classification Search .................. 711/103; 710/62
See application file for complete search history.

(56) References Cited

U.S. PATENT DOCUMENTS

| 6,266,710 B1* | 7/2001 | Dittmer et al. ............... 710/1 |
| 7,529,149 B2* | 5/2009 | Pyeon et al. ............. 365/230.03 |
| 2006/0143366 A1* | 6/2006 | Yang et al. ............... 711/103 |

* cited by examiner

*Primary Examiner* — Hashem Farrokh
(74) *Attorney, Agent, or Firm* — Muncy, Geissler, Olds & Lowe, PLLC

(57) ABSTRACT

A serial peripheral interface memory module using address cache comprises a flash memory array for storing data, a serial/parallel convertor for receiving serial signals and generating a control command, an address and data, an address register, an address accumulator for accumulating the address in the address register and storing the accumulated address back to the address register, and a flash memory controller for controlling the access to the flash memory array. When the control command is a standard command, the serial/parallel controller first stores the address following the control command into the address register and then the flash memory controller accesses data according to the address in the address register. When the control command is a specific command, the flash memory controller directly accesses data according to the address in the address register without waiting for an address update.

6 Claims, 5 Drawing Sheets

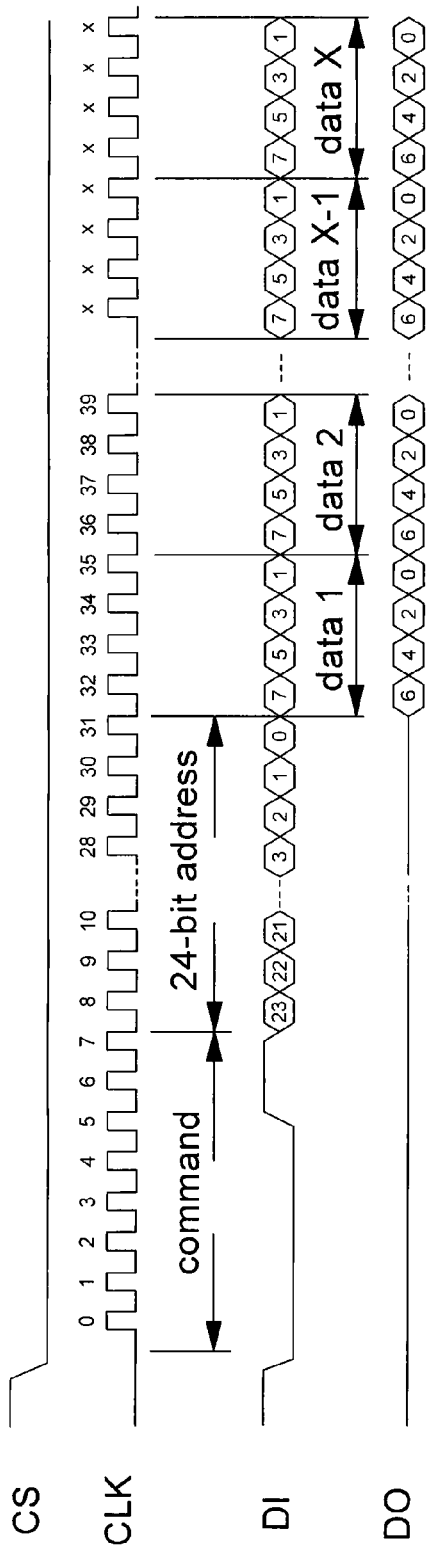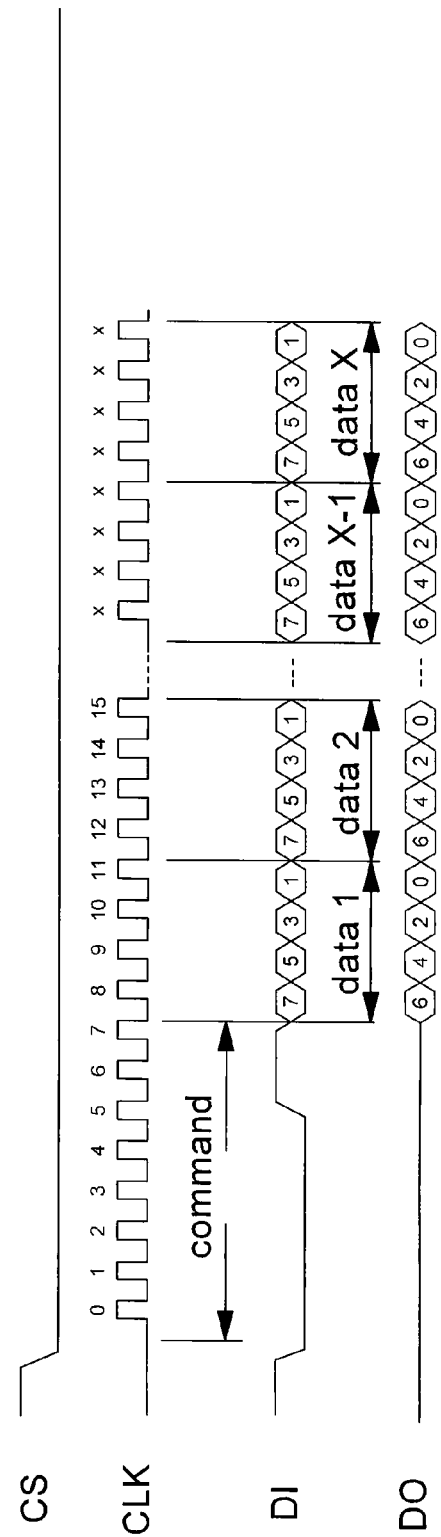
FIG. 6A
FIG. 6B

MEMORY MODULE AND CONTROL METHOD OF SERIAL PERIPHERAL INTERFACE USING ADDRESS CACHE

This application claims the benefit of the filing date of Taiwan Application Ser. No. 096140171, filed on Oct. 26, 2007, the content of which is incorporated herein by reference.

BACKGROUND OF THE INVENTION

1. Field of the invention

The present invention relates to a serial peripheral interface (SPI) memory module and a control method thereof. In particular, it relates to a SPI memory module using address cache and a control method thereof.

2. Description of the Related Art

The serial peripheral interface (SPI) in wide use nowadays uses different constant bit lengths to transmit control commands (8 bits), 24-bit addresses and then data bits, as shown in FIG. 1. However, when chip select signals are continuously enabled and associated addresses are continuous as well, 24-bit addresses are required to be transmitted repeatedly. As a result, the overall transmission efficiency is reduced and it fails to meet the bandwidth requirement for current high-speed transmission system.

In a general system with a cache, each time the chip select signal is enabled, the amount of accessed data is equal to a cache line size, typically ranging from 16 to 64 bytes. When the chip select signal is continuously enabled, the probability that its corresponding address is also continuous is about 80%~90%. Accordingly, if the number of transmitting the 24-bit address can be reduced, the speed of data access will increase.

SUMMARY OF THE INVENTION

In view of the above-mentioned problems, an object of the present invention is to provide a memory module and a control method of serial peripheral interface using address cache.

To achieve the above-mentioned object, a SPI memory module using address cache according to an embodiment of the present invention comprises a flash memory array for storing data; a serial/parallel convertor for receiving serial signals and generating a control command, an address and data; an address register; an address accumulator for accumulating the address in the address register and storing the accumulated address back to the address register; and, a flash memory controller for controlling the access to the flash memory array.

When the control command received by the serial/parallel converter is a standard command, the serial/parallel controller first stores the address subsequent to the control command into the address register and then the flash memory controller accesses data in the flash memory array according to the address in the address register. When the control command received by the serial/parallel converter is a specific command, the flash memory controller directly accesses data according to the address in the address register without waiting for an address update.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6A is a timing diagram that data is serially transmitted two bits for each clock period when the addresses associated with adjacent enabled chip select signals are not continuous according to an embodiment of the present invention.

FIG. 6B is a timing diagram that data is serially transmitted two bits for each clock period when the addresses associated with adjacent enabled chip select signals are continuous according to an embodiment of the present invention.

DETAILED DESCRIPTION OF THE INVENTION

The present invention will be described with reference to the accompanying drawings.

Figure 1:
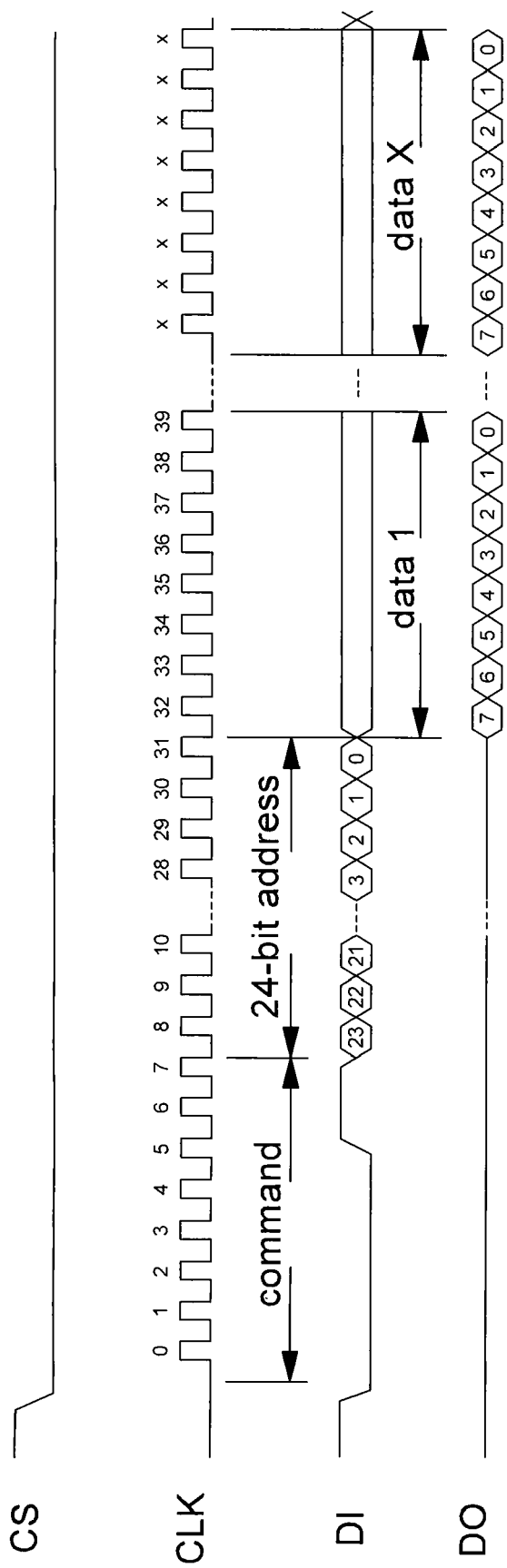
FIG. 1 is a schematic diagram showing that a conventional serial peripheral interface uses constant bit lengths to transmit control commands, address bits and data bits respectively.
Figure 2:
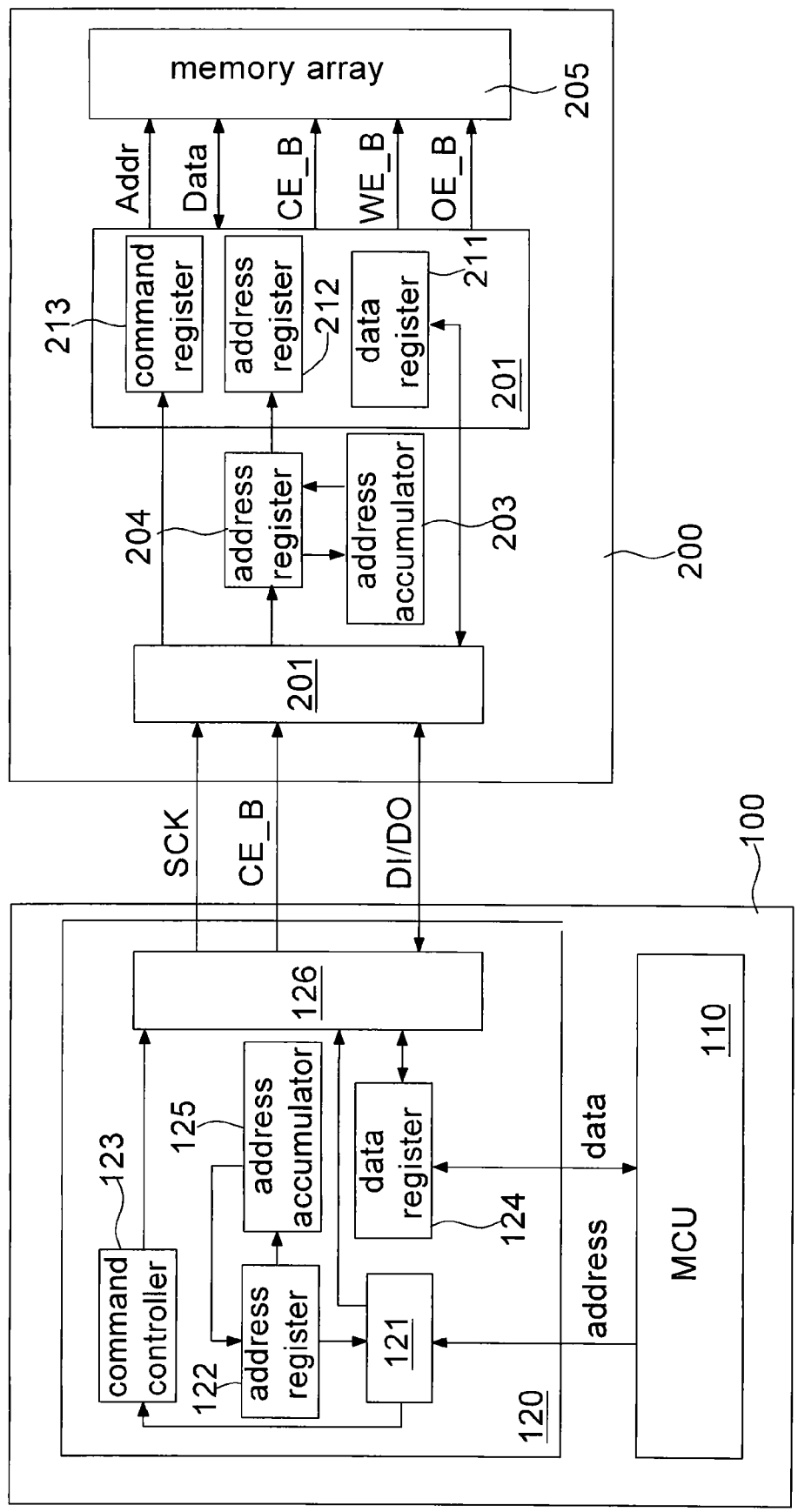
FIG. 2 is a block diagram of a SPI memory module using address cache according to an embodiment of the present invention.

FIG. 2 is a block diagram of a SPI memory system using address cache according to an embodiment of the present invention. As shown in FIG. 2, a SPI memory system using address cache comprises a system chip 100 and a flash memory module 200. When the system chip 100 receives an access command of memory data, it performs data access to the flash memory module 200. The system chip 100 is coupled to the flash memory module 200 by means of a plurality of input/output ports (I/O ports). The I/O ports include a system reference clock SCK, a chip select signal CE_B, a plurality of data signals DI, DO and so forth. Here, the plurality of data signals DI, DO are transmitted in serial form. The system chip 100 includes a micro-controller unit (MCU) 110 and a SPI controller 120. The SPI controller 120 includes a serial/parallel converter 126, a data register 124, a command controller 123, an address register 122, an address accumulator 125 and an address comparator 121.

The serial/parallel converter 126 (including functions of a serial interface codec unit and a serial transmission unit) is used to respectively convert commands, addresses and data into one-bit codes, or two-bit codes or four-bit codes for serial transmission and reception. That is, the serial/parallel converter 126 performs serial-to-parallel conversion or parallelto-serial conversion and its detailed description is omitted here. Obviously, the serial/parallel converter 126 can transmit data using either one bit or multiple bits at a time for serial transmission. For example, the data signals DI, DO are used to transmit data signals.

After the MCU 110 finishes accessing data associated with the access command, the address accumulator 125 accumulates the last access address and stores the accumulated last access address (i.e. a next access address) in the address register 122. The MCU 110 sends an address signal to the address comparator 121 and accesses the related data in the data register 124. After issuing a new access command, the MCU 110 transmits an address signal to the address comparator 121. At this time, the address comparator 121 compares the current access address with the next access address stored in the address register 122 to determine whether they are the same. If the access addresses are the same, it represents that the access addresses are continuous and the address comparator 121 sets a comparison signal with a first level. If the access addresses are different, the address comparator 121 sets the comparison signal with a second level. The command controller 123 outputs a control command signal to the SPI controller 120. After detecting that the comparison signal is at the first level, the command controller 123 sets the control command to a specific command, which will notify the SPI controller 120 using a specific communication protocol of the serial peripheral interface. After detecting that the comparison signal is at the second level, the command controller 123 sets the control command to a standard command, which will notify the SPI controller 120 using a standard communication protocol of the serial peripheral interface. For example, the SPI controller 120 sends a specific command to the serial/parallel converter 126 via the command controller 123. The serial/parallel converter 126 sends the specific command, such as 0x4bH, to notify the flash memory module 120 using the address subsequent to the last access address to access data. Afterward, the SPI controller 120 starts to receive or send data via the serial/parallel converter 126. Contrarily, if the access addresses are not continuous, the SPI controller 120 uses the standard communication protocol of the serial peripheral interface to transmit the standard read command, the address and the data.

Figure 5A:
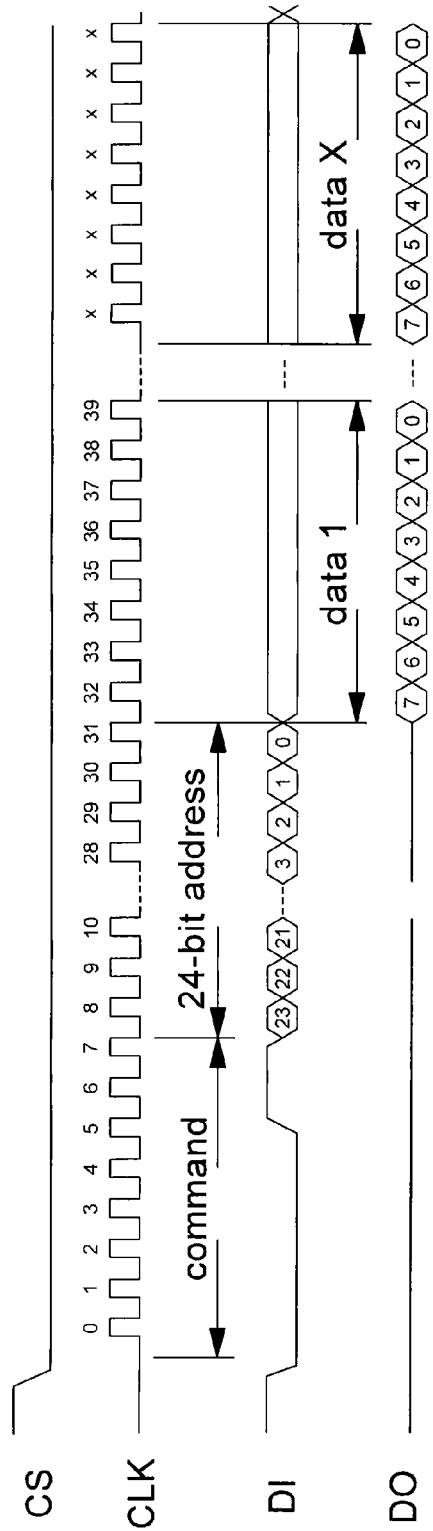
FIG. 5A is a timing diagram that data is serially transmitted one bit for each clock period when the addresses associated with adjacent enabled chip select signals are not continuous according to an embodiment of the present invention.
Figure 5B:
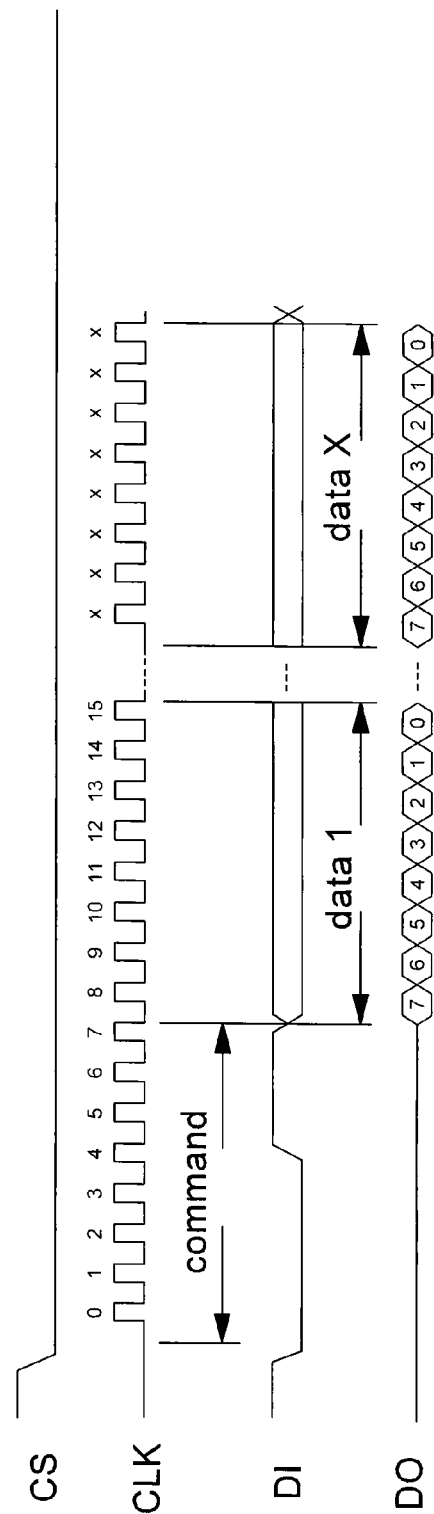
FIG. 5B is a timing diagram that data is serially transmitted one bit for each clock period when the addresses associated with adjacent enabled chip select signals are continuous according to an embodiment of the present invention.

FIG. 5A is a timing diagram that data is serially transmitted one bit for each clock period when the addresses associated with adjacent enabled chip select signals are not continuous (that is, the control command is a standard command) according to an embodiment of the present invention. FIG. 5B is a timing diagram that data is serially transmitted one bit for each clock period when the addresses associated with adjacent enabled chip select signals are continuous (that is, the control command is a specific command) according to an embodiment of the present invention. As can be observed in FIG. 5B, when the addresses associated with adjacent enabled chip select signals CS are continuous, the data signal DO is initiated to transmit data at the eighth clock of the clock signal CLK. Consequently, the time to transmit the 24-bit address is saved during the period that the chip select signals CS are enabled.

FIG. 6A is a timing diagram that data is serially transmitted two bits for each clock period when the addresses associated with adjacent enabled chip select signals are not continuous (that is, the control command is a standard command) according to an embodiment of the present invention. FIG. 6B is a timing diagram that data is serially transmitted two bits for each clock period when the addresses associated with adjacent enabled chip select signals are continuous (that is, the control command is a specific command) according to an embodiment of the present invention. As can be observed in FIG. 6B, when the addresses associated with adjacent enabled chip select signals CS are continuous, the data signal DO and DI are initiated to transmit data at the eighth clock of the clock signal CLK respectively. Consequently, the time to transmit the 24-bit address is saved during the period that the chip select signals CS are enabled.

According to the standard communication protocol of the serial peripheral interface, an 8-bit command, a 24-bit address and data are transmitted in sequence. By contrast, according to the special communication protocol of the serial peripheral interface, the data is directly accessed without waiting for any address signal after the 8-bit command is sent out. Consequently, if the access addresses are continuous, the SPI memory module using address cache according to the present invention can save the time of transmitting the address signal.

In addition, as shown in FIG. 2, the flash memory module 200 includes a serial/parallel converter 201, an address accumulator 203, a address register 204, a flash memory controller 210 and a flash memory array 205. The flash memory controller 210 and the flash memory array 205 are connected to each other by means of an address bus and a data bus, complying with many flash memory control interface standards, including but not limited to the standard JEDEC industry interface.

The flash memory controller 210 includes a command register 213, a address register 212 and a data register 211. The address register 212 of the flash memory controller 210 reads the content of the address register 204 as a next address where the flash memory array 205 will be accessed. The command register 213 receives the control command outputted by the serial/parallel converter 201. The data register 211 of the flash memory controller 210 temporarily stores the data from either the flash memory array 205 or the serial/parallel converter 201 and then transmits them to the flash memory array 205 or the serial/parallel converter 201.

After the flash memory module 200 finishes accessing data associated with the access command, the address accumulator 203 accumulates the current access address and stores the accumulated access address in the address register 204. After receiving a standard command, the serial/parallel converter 201 receives a subsequent 24-bit address signal and stores it in the address register 204. After receiving an specific command (e.g., 0x4bH), the serial/parallel converter 201 stops receiving a new address signal. In other words, the address register 204 will not be updated. At this time, the flash memory controller 210 directly uses the address stored in the address register 204 to access data and then sends the data back to the system chip 100 via the serial/parallel converter 201. Therefore, if the control command received by the serial/parallel converter 201 is the specific command, the serial/parallel converter 201 will output an access control signal to notify the flash memory module 200 directly using the address stored in the address register 204 to access data, without waiting for the serial/parallel converter 201 to receive the address signal. Consequently, the time for the serial/parallel converter 201 to receive the address signal can be saved.

Figure 3:
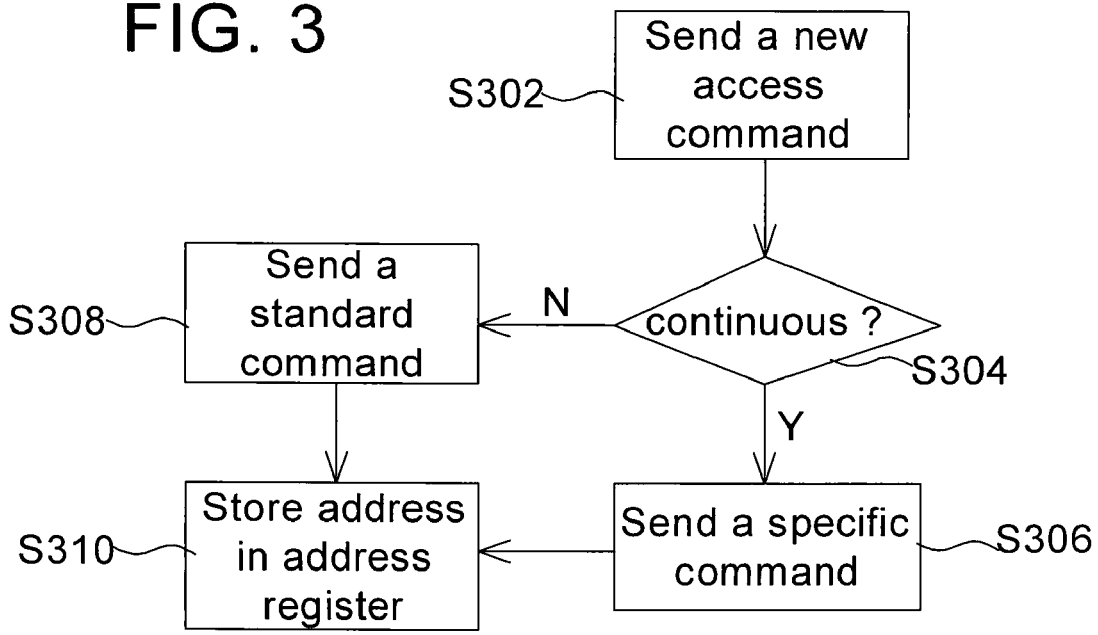
FIG. 3 is a flowchart illustrating the steps of the control method performed in a system chip according to an embodiment of the present invention.
Figure 4:
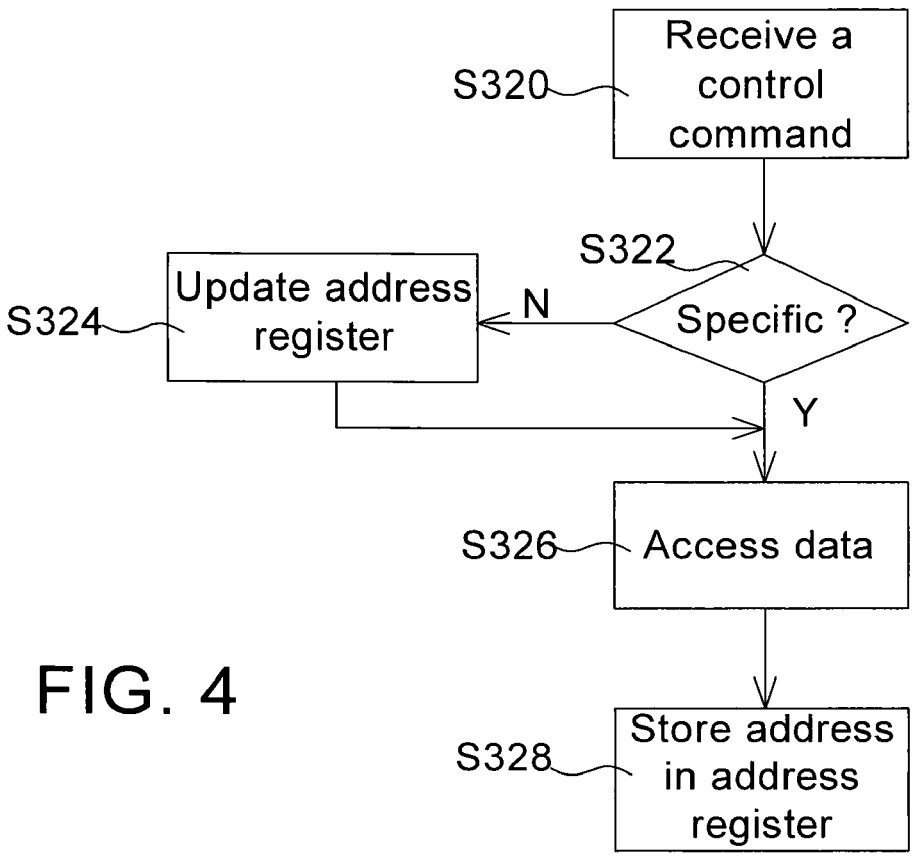
FIG. 4 is a flowchart illustrating the steps of the control method performed in the SPI memory module according to an embodiment of the present invention.

FIG. 3 and FIG. 4 are two flowcharts illustrating a control method of serial peripheral interface using address cache according to an embodiment of the present invention. FIG. 3 illustrates a control method of a system chip and FIG. 4 illustrates a control method of a SPI memory module. In accordance with FIGS. 2, 3 and 4, the control method of serial peripheral interface using address cache is detailed as follows.

Step S302: Send a new access command out.

Step S304: Detect whether access addresses are continuous. A system chip 100 is used to detect whether a current access address associated with a current access command to access the SPI memory module 200 and a previous access address associated with a previous access command to access the SPI memory module 200 are continuous. If they are continuous, the flow goes to Step S306; otherwise, the flow goes to Step 308.

Step S306: If the two access addresses are continuous, after transmitting a control command via a plurality of the signal lines, the system chip 100 directly accesses the data in the SPI memory module 200. Here, the control command is a specific command.

Step S308: If the two access addresses are not continuous, after sequentially transmitting the control command and an M-bit address signal via the plurality of the signal lines, the system chip 100 accesses the data in the SPI memory module 200. Here, the control command is a standard command.

Step S310: After finishing accessing data associated with the current access command, the system chip 100 stores the last access address into an address register 122, whereby the system chip 200 reads the previous access address from the second address register 122 in Step S304.

Step S320: Receive a control command. The SPI memory module 200 receives the control command transmitted by the system chip 100.

Step S322: Determine whether the control command is a specific command. If the control command is the specific command, the flow goes to Step S326. If the control command is a standard command, the flow goes to Step S324.

Step S324: Update an address register. The SPI memory module 200 receives the address signal transmitted by the system chip 100, and then writes it into an address register 204.

Step S326: Access data. The SPI memory module 200 accesses the data in a flash memory array 205 according to the address stored in the address register 205.

Step S328: Accumulate the address in the address register 204 and store the accumulated address back to the address register 204 after the SPI memory module 200 finishes accessing data associated with the control command.

Since the invention is applied to when access addresses are continuous, the system chip does not need to re-transmit the address signal to the memory module, and therefore the speed that the system chip accesses the memory module is increased.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A serial peripheral interface (SPI) memory module using address cache comprising:
    a serial/parallel converter, for receiving a reference clock signal and a chip select signal from a system chip, receiving a control command signal, a address signal and a data signal transmitted in serial via a plurality of signal lines from the system chip, and outputting a control command, an address bus signal and a data bus signal;
    a flash memory array, for storing the data bus signal;
    an address register, for storing an access address according to the address bus signal;
    an address accumulator for accumulating the access address stored in the address register and storing the accumulated access address back to the address register after the SPI memory module completes access; and
    a flash memory controller for receiving the control command and the access address stored in the address register to control the access to the flash memory array, wherein the flash memory controller either transmits data from the flash memory array to the serial/parallel converter or stores data from the serial/parallel converter to the flash memory array; wherein
    while the control command signal received by the serial/parallel converter is a standard command, the serial/parallel converter stores a portion of bits subsequent to the control command signal into the address register and then the flash memory controller starts to access the data; and
    while the control command signal received by the serial/parallel converter is a specific command, the flash memory controller starts to access data.

2. The memory module according to claim 1, wherein the serial/parallel converter transmits the data by one bit at a time.

3. The memory module according to claim 1, wherein the serial/parallel converter transmits the data by multiple bits at a time.

4. A control method of a serial peripheral interface (SPI) using address cache, the SPI coupled between a system chip and a memory module, wherein the system chip uses a plurality of signal lines to serially transmit a control command, a M-bit address and multiple-byte data to the memory module, and the system chip starts to access the memory module after receiving a current access command, the control method comprising:
    detecting whether two access addresses are continuous, wherein the system chip detects whether a current access address associated with the current access command to access the memory module and a previous access address associated with a previous access command to access the memory module are continuous, wherein if the two access addresses are not continuous, the control command is a standard command and the system chip accesses data in the memory module after transmitting the control command and the M-bit address by means of the plurality of the signal lines, otherwise, the system chip directly accesses the data in the memory module after transmitting the control command being a specific command by means of the plurality of the signal lines;
    transmitting the control command from the system chip to the memory module, wherein while the control command received by the memory module is the standard command, the memory module stores the subsequent M-bit address in a first address register as a first access address and then either receives associated data from the system chip or transmits the associated data to the system chip according to the first access address, and wherein while the control command received by the memory module is the specific command, the memory module directly either receives associated data from the system chip or transmits the associated data to the system chip according to the first access address; and
    accumulating the last access address and storing the accumulated last access address back to the first address register after the memory module finishes accessing the data associated with the current access command.

5. The control method according to claim 4, wherein the system chip stores the last access address into a second address register after finishing accessing the data associated with the current access command, whereby the second address register stores the previous access address associated with the previous access command to access the memory module.

6. A serial peripheral interface (SPI) controller, for using a plurality of signal lines to serially transmit a control command, a M-bit address signal and multiple-byte data to a memory module, wherein the SPI controller starts to access the memory module after receiving an access command, the SPI controller comprising:
   an address register, for storing a first access address;
   a data register, for storing the data;
   an address accumulator, for accumulating the first access address stored in the address register and storing the accumulated first access address back to the address register after the SPI controller finishes accessing data associated with the access command;
   an address comparator, for comparing the first access address in the address register with a second access address associated with the access command received by the SPI controller to generate a comparison signal and an address signal, wherein the comparison signal is set to a first level if both access addresses are the same, and the comparison signal is set to a second level if otherwise;
   a command controller, for receiving the comparison signal to output a control command signal, wherein the control command signal is a specific command if the comparison signal is at the first level and the control command signal is a standard command if the comparison signal is at the second level; and
   a serial/parallel convertor for outputting a reference clock and a chip select signal, transmitting the control command signal, the address signal from the address comparator and the data signal from the data register in serial according to the control command signal, or receiving an input data signal in serial from the memory module to be stored into the data register;
   wherein while the comparison signal is at the first level, the serial/parallel convertor starts to transmit or receive the data signal after outputting the control command signal; and
      while the comparison signal is at the second level, the serial/parallel convertor starts to transmit or receive the data signal after outputting the control command signal and then the M-bit address signal.

* * * * *